United States Patent
Koschany et al.

(10) Patent No.: US 6,451,470 B1
(45) Date of Patent: Sep. 17, 2002

(54) GAS DIFFUSION ELECTRODE WITH REDUCED DIFFUSING CAPACITY FOR WATER AND POLYMER ELECTROLYTE MEMBRANE FUEL CELLS

(75) Inventors: Arthur Koschany, Pöcking; Christian Lucas, Martinsried; Thomas Schwesinger, Kirchroth, all of (DE)

(73) Assignee: Magnet-Motor Gesellschaft für Magnetmotorische Technik mbH, Starnberg (DE)

( * ) Notice: Subject to any disclaimer, the term of this patent is extended or adjusted under 35 U.S.C. 154(b) by 0 days.

(21) Appl. No.: 09/380,536

(22) PCT Filed: Mar. 6, 1998

(86) PCT No.: PCT/EP98/01307
§ 371 (c)(1),
(2), (4) Date: Jan. 10, 2000

(87) PCT Pub. No.: WO98/39809
PCT Pub. Date: Sep. 11, 1998

(30) Foreign Application Priority Data

Mar. 6, 1997 (DE) .......................... 197 09 199

(51) Int. Cl.[7] .................. H01M 4/96
(52) U.S. Cl. .................. 429/40; 429/41; 429/42; 429/44; 429/46; 429/12
(58) Field of Search .................. 429/40, 41, 42, 429/44, 46, 12

(56) References Cited

U.S. PATENT DOCUMENTS

| | | | |
|---|---|---|---|
| 3,483,036 A | 12/1969 | Gregor | |
| 5,116,592 A | * 5/1992 | Weinberg | 423/415 R |
| 5,242,764 A | 9/1993 | Dhar | |
| 5,350,643 A | * 9/1994 | Imahashi et al. | 429/33 |
| 5,399,184 A | 3/1995 | Harada | |
| 5,521,020 A | 5/1996 | Dhar | |
| 5,607,785 A | 3/1997 | Tozawa | |
| 5,916,505 A | * 6/1999 | Cisar et al. | 264/85 |
| 5,952,119 A | * 9/1999 | Wilson | 429/34 |

FOREIGN PATENT DOCUMENTS

| | | | |
|---|---|---|---|
| DE | 1 496 172 | 5/1969 | |
| DE | 42 41 150 | 6/1994 | |
| DE | 195 13 292 | 8/1996 | |
| DE | 195 44 323 | 6/1997 | |
| EP | 0 687 023 | 12/1995 | |
| WO | WO 96/24958 | * 8/1996 | H01M/8/04 |
| WO | WO 97 20359 | 6/1997 | |
| WO | WO 97 24914 | 7/1997 | |

OTHER PUBLICATIONS

Bernardi D. M., "Water–Balance Calculations for Solid–Polymer–Electrolyte Fuel Cells", Journal of the Electrochemical Society, vol. 137, No. 11, Nov. 1990, pp. 3344–3350.

Wilkinson D. P. et al., "Water Management and Stack Design for Solid Polymer Fuel Cells", Journal of Power Sources, vol. 49, No. 1/03, Apr. 1994, pp. 117–127.

* cited by examiner

Primary Examiner—Patrick Ryan
Assistant Examiner—Angela J Martin
(74) Attorney, Agent, or Firm—Venable; Robert Kinberg; Ashley J. Wells

(57) ABSTRACT

Gas diffusion electrodes (1) for polymer electrolyte membrane fuel cells are modified such that the diffusion of water therein is inhibited in comparison with un-modified electrodes. Polymer electrolyte membrane fuel cells with the modified gas diffusion electrodes can be operated, with on the average unchanged operating conditions, without addition of water, since the gas diffusion electrodes do not allow more water to escape than that formed during the reaction of burnable gas and oxidizing agent, and guarantee sufficient membrane moisture.

38 Claims, 1 Drawing Sheet

GAS DIFFUSION ELECTRODE WITH REDUCED DIFFUSING CAPACITY FOR WATER AND POLYMER ELECTROLYTE MEMBRANE FUEL CELLS

BACKGROUND OF THE INVENTION

1. Field of the Invention

The invention relates to a gas diffusion electrode for a polymer electrolyte membrane fuel cell to be operated with a burnable gas and an oxygen-containing gas and comprising an anode electrode, a cathode electrode and a polymer electrolyte membrane disposed therebetween, a polymer electrolyte membrane fuel cell having at least one such gas diffusion electrode, and a method of operating a polymer electrolyte membrane fuel cell.

2. Description of the Related Art

Polymer electrolyte membrane fuel cells contain an anode electrode, a cathode electrode and an ion exchange membrane disposed therebetween. A plurality of fuel cells forms a fuel cell stack, with the individual fuel cells being separated from one another by bipolar plates acting as current collectors. For generating electricity, a burnable gas, e.g. hydrogen, is introduced into the anode region, and an oxidizing agent, e.g. air or oxygen, is introduced into the cathode region. Anode and cathode, in the regions in contact with the polymer electrolyte membrane, each contain a catalyst layer. Alternatively, the catalyst layers may also be applied to the surface of the polymer electrolyte membrane in contact with the anode electrode and the cathode electrode, respectively. In the anode catalyst layer, the fuel is oxidized thereby forming cations and free electrons, and in the cathode catalyst layer, the oxidizing agent is reduced by taking up electrons. The cations migrate through the ion exchange membrane to the cathode and react with the reduced oxidizing agent, thereby forming water when hydrogen is used as burnable gas and oxygen is used as oxidizing agent.

The function of the gas diffusion electrodes consists mainly in discharging the current produced to the current collectors and to allow the reaction gases to diffuse through to the catalytically active layers. The electrodes thus must be electrically conductive and have sufficient diffusion capacity for the reaction gases. Preferably, the electrodes should be hydrophobic at least in the regions facing the membrane, in order to prevent water formed during the reaction from flooding the pores of the electrodes.

In the reaction of burnable gas and oxidizing agent, heat is released which causes evaporation of the water present in electrodes and membrane. The vapor is discharged along with the oxidizing agent stream. This evaporation, on the one hand, causes an indeed desirable cooling of the fuel cell, but on the other hand results in gradual depletion of moisture in the fuel cell. When too much moisture can leak out through the porous electrodes, the moisture content of the polymer electrolyte membrane decreases. The conductivity of the membrane is strongly dependent on its water content. Reduction of the humidity content of the polymer electrolyte membrane has the result that its internal resistance increases, i.e. its conductivity decreases. However, this causes also the performance of the fuel cell to decrease. Efficient operation of a polymer electrolyte membrane fuel cell thus necessitates that the membrane at all times have sufficient moisture at the particular operating conditions (temperature, load). For this reason, it is necessary in fuel cells with conventional gas diffusion electrodes to supply thereto water in the form of vapor or liquid during operation of the fuel cell. In some embodiments, the supply of membrane humidifying water takes place at the same time with the supply of cooling water, in other embodiments there is provided a separate supply. Care has to be taken that exactly the correct amount of membrane humidifying water is supplied at all times, since a too small amount leads to gradual drying out of the membrane, whereas a too great amount of water supplied results in flooding of the electrodes. It is thus required during operation of the fuel cells to constantly, or at least in short regular intervals, ascertain the moisture content of the membrane and, if necessary, to supply water. This necessitates an additional, external humidifying system subjecting the fuel cells to additional weight and causing additional costs. Up to one third of the weight and costs of a fuel cell stack with conventional electrodes are due to the external humidifying system.

It is the object of the present invention to make available a gas diffusion electrode and, respectively, a polymer electrolyte membrane fuel cell comprising gas diffusion electrode, which allows sufficient membrane moisture to be maintained with continuous operation of the fuel cell under unchanged operating conditions on the average, without water being added for membrane humidification.

Furthermore, it is an object of the invention to make available a method of operating a polymer electrolyte membrane fuel cell in which sufficient membrane moisture is maintained without membrane humidifying water being added.

SUMMARY OF THE INVENTION

The object is met by the gas diffusion electrode according to claim 1, the polymer electrolyte membrane fuel cell according to claim 21 and the method of operating a polymer electrolyte membrane fuel cell according to claim 22. Advantageous developments of the invention are indicated in the respective dependent claims.

DESCRIPTION OF THE PREFERRED EMBODIMENTS

Figure 1:
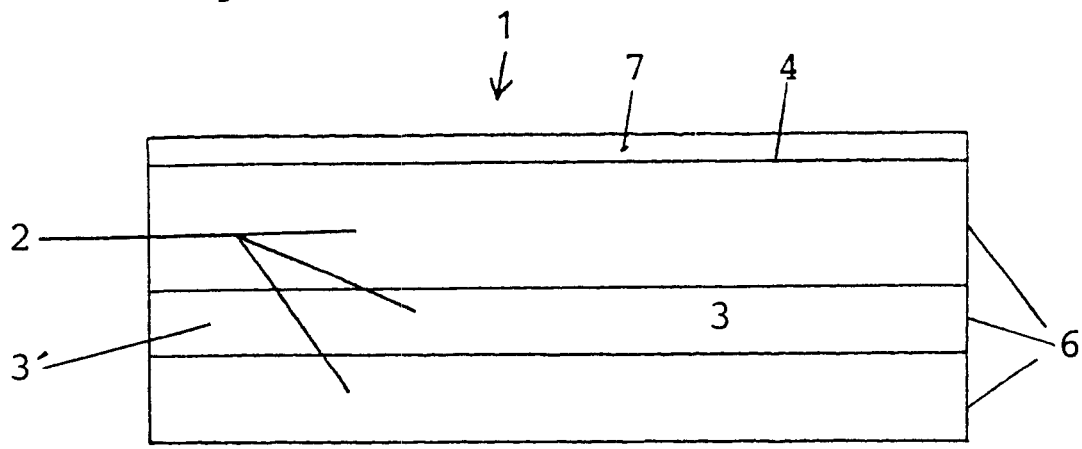
FIG. 1 shows a gas diffusion electrode according to a preferred embodiment of the invention.

Gas diffusion electrodes consist of porous materials, typically of mats of graphitized fabric. The higher the porosity of the electrode material, the better the diffusion properties to be expected for the reaction gases, but also the faster the onset of a depletion of moisture in the membrane unless an external system for membrane humidification is provided.

The invention is based on the fact that it is possible to change the effective diffusion constant of gas diffusion electrodes such that just the necessary amount of reaction gases necessary to obtain a desired current density can still reach the catalyst, whereas the diffusion of water vapor from the catalyst layer to the gas space is aggravated to such an extent that drying out of the membrane is avoided. The membrane thus retains its conductivity.

In fuel cells using air or oxygen as oxidizing agent, the formation of reaction water takes place on the cathode side of the membrane. The design of the gas diffusion electrode according to the invention thus is particularly advantageous for the cathode, and it is often sufficient to equip fuel cells only with a cathode according to the invention, but with a conventional anode. The modification of the gas diffusion electrodes according to the invention, of course, is possible in general both for cathodes and for anodes.

Electrodes according to the invention, under suitable operating conditions, do not allow more water to escape than the water formed, i.e. it is possibly just necessary in the starting phase of the fuel cells to adjust the moisture content of the membrane in accordance with the operating conditions. If necessary, this can take place simply by spraying water in the cathode space. During the subsequent phase of continuous operation under substantially constant conditions, the moisture of the membrane is maintained without water being added. The prerequisite for such fuel cell operation without addition of water is that, with a given cell voltage and air ratio, an electrode temperature is adjusted at which the water situation is balanced, i.e. in which just as much water is formed as is lost by diffusion. The cooling system each time must adjust this temperature or a temperature just below the same. It has been found that the effective diffusion constant of gas diffusion electrodes can be varied in a range such that, with a given cell voltage and air ratio, a balanced water situation can be obtained for a large range of current densities below the limit current density. For simplifying cooling, it is preferred that electrode temperatures of at lest 50° C. are set. Particularly preferred are electrode temperatures in the range of 60 to 75° C. The higher the air pressure and the lower the air ratio are chosen, the higher may be the operating temperature. If the air is supplied under ambient pressure, the maximum possible operating temperature is about 75° C. This value is due to the diffusion properties of the electrodes. The modification of the diffusion properties of gas diffusion electrodes according to the invention indeed permits an efficient restriction of the diffusion of water, but to a lesser extent also affects the diffusion of the reaction gases. Starting from a specific temperature, which at ambient pressure is about 75° C., a gas diffusion electrode having a sufficiently low effective diffusion coefficient for water would no longer ensure sufficient diffusion for the reaction gases, in particular oxygen. However, increasing the air pressure permits the working temperature to be increased further.

The gas diffusion electrodes according to the invention can be made on the basis of conventional electrode materials. Particularly preferred as an alternative are electrodes according to German patent application No. 194 44 323.3-45. These electrodes consist of at least one carbon fiber nonwoven fabric that is impregnated with soot and polytetrafluoroethylene in. substantially homogenous manner. The manufacture of these electrodes will still be described hereinafter.

The gas diffusion electrodes according to the invention distinguish themselves in that at the same time their effective diffusion constant for reaction gases, in particular oxygen, is sufficiently high and their effective diffusion constant for water is sufficiently low so that, in polymer electrolyte membrane fuel cells equipped with gas diffusion electrodes according to the invention, sufficient diffusion of the reaction gases is guaranteed on the one hand while on the other hand the diffusion of water vapor is restricted to such an extent that the water situation is balanced. The membrane thus remains moist.

Gas diffusion electrodes having the required effective diffusion constants can be achieved by different types of modifications of conventional electrodes.

One possibility consists in compressing the electrode material by pressing. Pressing takes place preferably prior to catalyst application, at a pressure of 200 to 4000 bar. Particularly preferred are compression pressures of 2000 to 3500 bar. The method is employed in particularly advantageous manner with electrodes according to German patent application No. 195 44 323.3-45.

Another possibility of sealing the electrode material against water losses is to introduce a filling material into part or the entire diffusion region of the electrode. The filling material reduces the size of the pores in the electrode material or closes the same completely, causing diffusion inhibition. If the filling material is to be present only in part of the electrode, it is preferred to introduce the filling material as shown in FIG. 1. FIG. 1 depicts a gas diffusion electrode 1 having a gas diffusion layer 6 of an electrode material 2. A surface 4 of the electrode has a catalyst layer 7 provided thereon. The diffusion layer contains a filling material 3 in a partial region 3'. Partial region 3' extends across the entire area of the electrode, but not across the entire thickness thereof, i.e. it does not extend as far as the surfaces of the electrode. With the particular filling material 3, diffusion inhibition makes itself felt the more the larger the regions containing filling material. However, the filling material preferably does not extend as far as into catalyst layer 7 of electrode 1.

Suitable filling materials are solid or liquid substances that can be introduced into the pores of an electrode and remain there in substantially unchanged manner under the operating conditions of a polymer electrolyte membrane fuel cell.

Solids are preferably introduced in the form of a suspension into the pores of the electrode. Filling materials with good suitability are soot, graphite, metals and plastics, in particular PTFE. The same material of which the electrode is made can also be used, in particulate form, as filling material.

The use of solids with little or no porosity as filling material reduces the effective diffusion constant of the electrode more clearly than porous filling materials. The filling material particles may have arbitrary configurations, for example, they may be powdery, fiber-shaped or platelet-shaped. A particularly dense electrode structure is obtained when the electrodes, after having been filled with filling material, are pressed additionally, for which lower pressures, preferably about 200 to 300 bar, are already sufficient.

The filling material may also be a liquid. Particularly suitable are non-polar, hydrophobic liquids since they display a greatly different behavior with respect to water and the burnable gases. Hydrophobic liquids inhibit the diffusion of water very much, but dissolve the non-polar burnable gases, such as hydrogen and oxygen, so that these can diffuse with less hindrance. Especially well suited liquid filling materials are fluorocarbon compounds, in particular Hostinert® (product of the company Hoechst AG).

Figure 2:
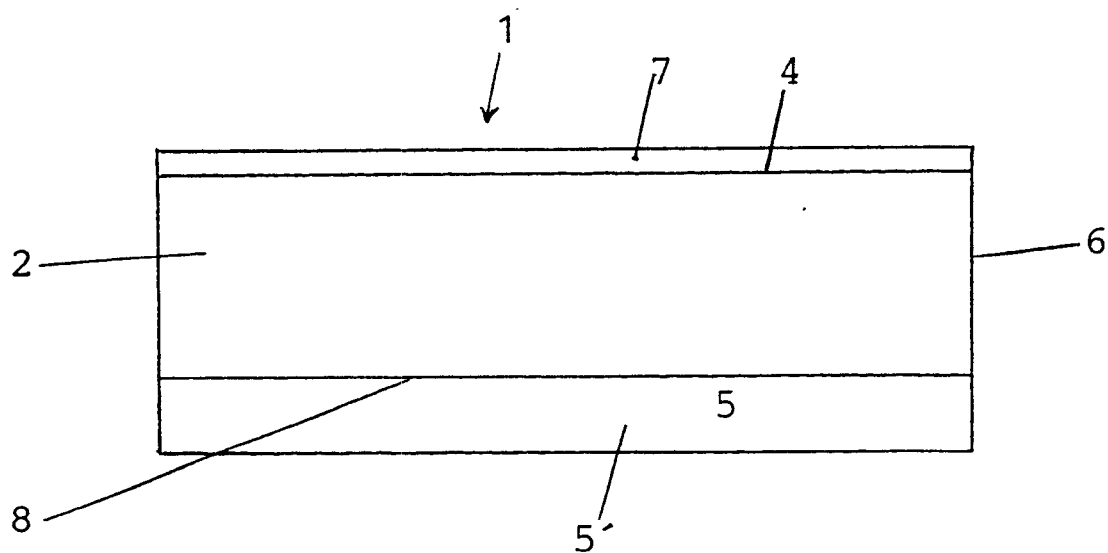
FIG. 2 shows a gas diffusion electrode according to a further preferred embodiment of the invention.

According to an additional embodiment of the gas diffusion electrode according to the invention, the reduction of the effective diffusion constant can take place by applying a layer of an additional material on a surface of the electrode. Such an embodiment is shown in FIG. 2. The gas diffusion electrode 1 according to FIG. 2 consists of an electrode material 2 constituting a diffusion layer 6, a catalyst layer 7 provided on a surface 4, and of a layer 5' of another material 5, provided on the other surface 8. Material 5 may be identical with the electrode material 2, so that the reduction of the effective diffusion constant is caused by simple thickening of the electrode. Materials with good suitability are soot, graphite, metals and plastics materials as well as mixtures of these materials. Layer 5' is preferably made of carbonized or graphitized polyimide, carbonized or graphitized polyacrylonitrile or expanded PTFE. Manufacture can take place by applying a material 5 in particulate form, e.g. in the form of powder, platelets or fibers, to a surface 8 of gas diffusion layer 6 and by a subsequent pressing operation. During pressing, the layer 5' of material 5 is compressed, in which part of the material 5, at the interface between diffusion layer 6 and additional layer 5', may penetrate the pores of diffusion layer 6. The additional, diffusion-inhibiting layer 5' may consist of one material or mixtures of different materials. Particularly preferred is a layer 5' of a pressed-on mixture of graphite and PTFE powder as well as a layer of metal or graphite platelets. If layer 5' consists of a material without electrical conductivity or poor electrical conductivity, it must have through-openings through which current conductors can be passed. Passages may also be required in case of conductive materials, for example for feeding and discharge lines for reaction gases. If layer 5' is too dense to permit sufficient diffusion of the reaction gases, e.g. in case of incorporated metal platelets, layer 5' needs to be formed with openings for passage of the reaction gases.

In the following, various methods of making gas diffusion electrodes according to the invention will be described in exemplary manner:

EXAMPLE 1

45 g soot (Vulcan XC72) is suspended in 450 ml water and 495 ml isopropanol. This suspension is mixed intensively with 32.17 g of a PTFE suspension (60% Hostaflon fibers in aqueous suspension). The resulting mixture is spread evenly on a carbonized carbon fiber nonwoven fabric (3 mg/cm$^2$) and the nonwoven fabric thereafter is dried at approx. 70° C. Spreading and drying are repeated twice. After the last drying step, the impregnated carbon fiber nonwoven fabric is sintered for approx. 30 minutes at 400° C. A carbon fiber nonwoven fabric is thus obtained that is evenly impregnated with Vulcan XC72 and Hostaflon and has a mass of 7.8 bis 8 mg/cm$^2$. The PTFE content is 30% with respect to the overall mass of soot plus PTFE. The homogenously impregnated nonwoven fabric corresponds to a gas diffusion electrode according to German patent application serial No. 195 44 323.3-45.

For manufacturing the gas diffusion electrode according to the invention, four of the carbon fiber nonwoven fabrics made as elucidated hereinbefore are placed on top of one another and subject to a pressure of 3200 bar. In doing so, the carbon fiber nonwoven fabrics are firmly joined together and compressed to such an extent that they offer great resistance to the diffusion of water, but allow hydrogen and also oxygen to diffuse through in satisfactory manner.

EXAMPLE 2

Three carbonized carbon fiber nonwoven fabrics of a mass of 3 mg/cm$^2$ are used as starting materials.

One of the nonwoven fabrics is impregnated with a suspension of 30% Hostaflon (PTFE) TF5032, 7% graphite (KS75 of the company Timcal) and 63% soot (Vulcan XC72 of the company Cabot) in a mixture of isopropanol and water. The final mass of the dry nonwoven fabric is 10 mg/cm$^2$.

The second nonwoven fabric is impregnated with a suspension of 30% Hostaflon, 40% graphite and 30% soot in isopropanol and water as suspension agent. The final mass of the dry nonwoven fabric is 16 mg/cm$^2$.

The third nonwoven fabric is impregnated with a suspension of 10% Hostaflon, 80% graphite and 10% soot in isopropanol and water as suspension agent. The final mass of the dry nonwoven fabric is 22 mg/cm$^2$.

The nonwoven fabrics were sintered at 400° C. for five minutes, stacked onto one another and pressed together at a temperature of 140° C. and a pressure of 200 to 300 bar. Thereafter, a catalyst layer can be applied onto the surface of the first nonwoven fabric, and the gas diffusion electrode can be combined with a polymer electrolyte membrane and an additional electrode so as to form a membrane electrode unit.

EXAMPLE 3

A thick suspension of Hostaflon (5%) and graphite (95%) is formed in isopropanol/water. The suspension is applied with a layer thickness of 0.8 mm to a high-grade steel plate and dried. Thereafter, a conventional gas diffusion electrode or one or two carbon fiber nonwoven fabric electrode(s) made as described in Example 1 are pressed on, and the electrode is sintered along with the layer of Hostaflon and graphite. After sintering, the catalyst can be applied to the surface of the gas diffusion electrode not provided with the Hostaflon/graphite layer. It is also possible to press onto the Hostaflon-graphite layer a gas diffusion electrode that already carries a catalyst, so that the Hostaflon-graphite layer is disposed between two layers of electrode material. However, temperatures must then be used for sintering that are not detrimental to the catalyst.

The gas diffusion electrode according to the invention, having a diffusion-inhibiting layer of graphite/Hostaflon, in turn, can be combined with a polymer electrolyte membrane and a further electrode so as to form a membrane electrode unit. When the graphite/Hostaflon layer is applied to an outer surface, it is advantageous to add a carbon paper or an impregnated carbon fiber nonwoven fabric for protection thereof.

EXAMPLE 4

A membrane electrode unit is made from arbitrary conventional electrodes and a polymer electrolyte membrane. Behind the cathode, there is disposed a 0.1 mm thick sheet metal of nickel or stainless steel. The metal sheet has bores of a diameter of 0.3 to 0.4 mm in a square grid pattern of 1.2 mm. The surface of the cathode thus is covered in part, whereby less free surface is available for the escape of water.

In polymer electrolyte membrane fuel cells, both electrodes can be formed as gas diffusion electrodes with reduced diffusion capacity for water according to the invention. As a rule, it is sufficient for one electrode, the cathode, to be formed in accordance with the invention.

Polymer electrolyte fuel cells provided with at least one electrode according to the invention can be operated in continuous operation without external humidification, i.e. without addition of water, since the membrane retains its humidity as there is not more water escaping than that formed during the reaction of burnable gas and oxidizing agent. It is sufficient to humidify the membrane when starting operation and, possibly, upon changing the operating conditions. It is thus possible to dispense with a humidifying means that is continuously attached to the fuel cell, thereby saving weight and costs. Cooling can take place by cooling means, such as e.g. cooling loops or cooling plates provided in the bipolar plates and having water flowing therethrough, or by air blown into the cathode spaces. Direct air cooling (by dry air) is possible at least for smaller fuel cell stacks and again saves weight and costs as compared to water cooling. Furthermore, in case of air cooling, corrosion problems in the cooling system due to different electric potentials can be avoided.

Air-cooled fuel cell stacks with gas diffusion electrodes according to the invention thus are independent of an external water supply.

The values of the particular optimum diffusion constant of the gas diffusion electrodes according to the invention are dependent on the operating conditions of the fuel cells. In case of a membrane Gore Select 20 $\mu$m and at preferred operating conditions with an air pressure of 60 mbar above atmospheric, the air ratio 16, a hydrogen pressure of 0.38 bar above atmospheric, an electrode temperature of about 70° C. and a current density of 503 mA/cm$^2$ at 625 mV, the effective diffusion constant for water should be in the range of $3\times10_{-3}$ to $15\times10^{-3}$ cm$^2$/s and the effective diffusion constant for oxygen should be in the range of $2\times10^{-3}$ to $12\times10^{-3}$ cm$^2$/s. The optimum effective diffusion constants for water and oxygen under these operating conditions are $7.7\times10^{-3}$ cm$^2$/s and $5.7\times10^{-3}$ cm$^2$/s (related to 20° C.), respectively.

Furthermore, the values of the optimum diffusion constants are dependent on the properties of the membrane (e.g. conductivity as a function of water content; water vapor partial pressure as a function of temperature and water content). Depending on the system used and the operating conditions, the values of the optimum diffusion constants thus may vary within wide limits. What is essential is that the diffusion constant have a value at which it is ensured for the system chosen that water vapor can hardly diffuse, thereby ensuring sufficient membrane moisture, while the reaction gases still can diffuse sufficiently. Accordingly, the porosity of the electrodes must be adjusted by way of suitable measures, as outlined hereinbefore.

In the following, some examples will be given of matched systems:

A polymer electrolyte membrane fuel cell having a conventional anode, a membrane Gore Select (thickness 20 $\mu$m) and a cathode according to Example 1 or a cathode according to Example 3, consisting of a layer structure of carbon fiber nonwoven fabric electrode, graphite/Hostaflon layer and gas diffusion electrode carrying catalyst (electrode according to German patent application No. 195 44 323.3-45), is operated on the following conditions:

$H_2$ pressure above atmospheric: 0,5 bar
air pressure above atmospheric: 0.06 bar
air ratio: 16
cathode temperature: 68° C.

The cathodes used have effective diffusion constants for water and oxygen of $7.7\times10^{-3}$ cm$^2$/s and $5.7\times10^{-3}$ cm$^2$/s, respectively.

In this respect, the following performance data result:

| U [mV] | I ma/cm$^2$ |
| --- | --- |
| 965 | 0 |
| 891 | 9.5 |
| 768 | 175 |
| 735 | 240 |
| 665 | 470 |
| 625 | 503 |
| 150 | 675 |

The most favorable load point is at 503 mA/cm$^2$. At 675 MA/cm$^2$ the diffusion inhibition has an extreme effect.

A reduction of the air ratio to 1.5 has the effect that the cathode temperature can be increased to about 78° C. The cell voltage attainable, however, then remains below 625 mV.

With the following operating conditions
$H_2$ pressure above atmospheric: 0.5 bar
air pressure above atmospheric: 1 bar
air ratio: 1.5
cathode temperature: 78° C.
current density: 500 mA/cm$^2$ the effective diffusion constant of the cathode can be increased by about 25% to $9.6\times10^{-3}$ cm$^2$/s for water vapor and $7.1\times10^{-3}$ cm$^2$/s for oxygen. The cell voltage then is higher than 625 mV.

With a given effective diffusion constant, the electrodes should be as thin as possible (i.e. very dense) in order to render possible good heat dissipation by good thermal conductivity.

It is of particular advantage to subject fuel cells equipped with gas diffusion electrodes according to the invention, during 0.1 to 20% of the operating time, preferably 4 to 10% of the operating time, to such high loads that the cell voltage decreases to a value below 300 mV, preferably below 150 mV. Such a brief short-circuiting, which preferably is carried out in regular intervals, each time effects a temporary power increase of the cell. It is thus recommendable for power increase to "pulse" the cells with a specific frequency: intervals of brief short-circuits (e.g. approx. 1 sec) alternate with intervals of normal fuel cell operation (e.g. approx. 1 min). The duration of the normal operating intervals is dependent on the duration of the power increase obtained. In case the power increase drops below a desired minimum value, renewed short-circuiting etc. is carried out.

The method of increasing the performance of fuel cells by pulsed operation is independent of the electrode type chosen and can be carried out with any fuel cell.

The invention makes available gas diffusion electrodes with decreased diffusion capacity for water. The use of these electrodes renders possible to operate polymer electrolyte membrane fuel cells without addition of water and possibly with direct air cooling. This provides savings as regards weight and costs in comparison with conventional fuel cells.

What is claimed is:

1. A gas diffusion electrode for a polymer electrolyte membrane fuel cell to be operated with a burnable gas and an oxygen-containing gas as oxidizing agent, comprising:
    an anode electrode;
    a cathode electrode; and
    a polymer electrolyte membrane disposed between the anode electrode and the cathode electrode,
    wherein at least one electrode selected from the group consisting of the anode electrode and the cathode electrode function as the gas diffusion electrode,
    wherein the gas diffusion electrode has an effective diffusion constant for water, and
    wherein the gas diffusion electrode is filled, in at least a partial region thereof, with a filling material which reduces the effective diffusion constant of the gas diffusion electrode for water, which filling material is present in such an amount that, during a phase of continuous operation of the fuel cell under constant conditions, sufficient moisture of the polymer electrolyte membrane is maintained without adding water from outside the fuel cell for humidification of the polymer electrolyte membrane.

2. The gas diffusion electrode of claim 1, which is a compressed electrode due to having been subjected to compression during manufacture.

3. The gas diffusion electrode of claims 2, wherein the compression was at a pressure ranging from 200 to 4000 bar.

4. The gas diffusion electrode of claim 2, wherein the compression was at a pressure ranging from 200 to 400 bar.

5. The gas diffusion electrode of claim 2, wherein the compression was at a pressure ranging from 1000 to 4000 bar.

6. The gas diffusion electrode of claim 2, wherein the compression was at a pressure ranging from 2000 to 3500 bar.

7. The gas diffusion electrode of claim 1, wherein the filling material is contained in a partial region that is not confined by a surface of the gas diffusion electrode.

8. The gas diffusion electrode of claim 1, wherein the gas diffusion electrode is composed of at least one gas diffusion layer and a catalyst layer, and wherein the filling material is located solely in the diffusion layer.

9. The gas diffusion electrode of claim 1, wherein the filling material is a nonporous solid material.

10. The gas diffusion electrode of claim 1, wherein the filling material is at least one substance selected from the group consisting of soot, graphite, a metal, and a plastics material.

11. The gas diffusion electrode of claim 10, wherein the plastics material is PTFE.

12. The gas diffusion electrode of claim 1, wherein the filling material has a form selected from the group consisting of powder, fibers, platelets, and mixtures thereof that have been introduced as a suspension.

13. The gas diffusion electrode of claim 1, wherein the filling material is a liquid.

14. The gas diffusion electrode of claim 13, wherein the liquid is a fluorocarbon compound.

15. The gas diffusion electrode of claim 1, wherein the gas diffusion electrode includes a layer of at least one additional material, which layer reduces the effective diffusion constant of the gas diffusion electrode for water.

16. The gas diffusion electrode of claim 1, wherein the gas diffusion electrode is composed of an electrode material comprising at least one carbon fiber, nonwoven fabric that is impregnated with soot and PTFE.

17. The gas diffusion electrode of claim 16, wherein the electrode material comprises at least two plies of the carbon fiber, non-woven fabric that is impregnated with soot and PTFE.

18. A polymer electrolyte membrane fuel cell, comprising:
an anode electrode;
a cathode electrode; and
a polymer electrolyte membrane disposed between the anode electrode and the cathode electrode,
wherein at least one electrode selected from the group consisting of the anode electrode and the cathode electrode functions as the gas diffusion electrode as defined in claim 1.

19. The polymer electrolyte membrane fuel cell of claim 18, wherein the gas diffusion electrode has an operating temperature ranging from 60 to 75° C.

20. The polymer electrolyte membrane fuel cell of claim 18, wherein cooling of the polymer electrolyte membrane fuel cell is effected solely by means of an air stream passed through the cathode space.

21. The polymer electrolyte membrane fuel cell of claim 18, wherein cooling of the polymer electrolyte membrane fuel cell is effected by water cooling.

22. A gas diffusion electrode for a polymer electrolyte membrane fuel cell to be operated with a burnable gas and an oxygen-containing gas as oxidizing agent, comprising:
an anode electrode;
a cathode electrode; and
a polymer electrolyte membrane disposed between the anode electrode and the cathode electrode,
wherein at least one electrode selected from the group consisting of the anode electrode and the cathode electrode function as the gas diffusion electrode,
wherein the gas diffusion electrode has an effective diffusion constant for water,
wherein the gas diffusion electrode comprises a layer of at least one additional material which reduces the effective diffusion constant of the gas diffusion electrode for water such that, during a phase of continuous operation of the fuel cell under constant conditions, a sufficient moisture of the polymer electrolyte membrane is maintained without adding water from outside of the fuel cell for humidification of the polymer electrolyte membrane.

23. The gas diffusion electrode of claim 22, which is a compressed electrode due to having been subjected to compression during manufacture.

24. The gas diffusion engine of claim 23, wherein the compression was at a pressure ranging from 200 to 4000 bar.

25. The gas diffusion engine of claim 23, wherein the compression was at a pressure ranging from 200 to 400 bar.

26. The gas diffusion engine of claim 23, wherein the compression was at a pressure ranging from 1000 to 4000 bar.

27. The gas diffusion engine of claim 23, wherein the compression was at a pressure ranging from 2000 to 3500 bar.

28. The gas diffusion electrode of claim 22, wherein the additional material is at least one substance selected from the group consisting of soot, a metal, and a plastics material.

29. The gas diffusion electrode of claim 22, wherein the additional material is a substance selected from the group consisting of (a) carbonized or graphitized polyimide, (b) carbonized or graphitized polyacrylonitrile, or (c) expanded PTFE.

30. The gas diffusion electrode of claim 22, wherein the layer of the additional material consists of a pressed-on mixture of graphite and PTFE powder.

31. The gas diffusion electrode of claim 22, the layer of the additional material consists of one of metal or graphite platelets.

32. The gas diffusion electrode of claim 22, wherein the layer of the additional material is provided with through-openings.

33. The gas diffusion electrode of claim 22, wherein the gas diffusion electrode comprises an electrode material, and wherein the electrode material comprises at least one carbon fiber, non-woven fabric that is impregnated with soot and PTFE.

34. The gas diffusion electrode of claim 33, wherein the electrode material comprises at least two plies of the carbon fiber, non-woven fabric that is impregnated with soot and PTFE.

35. A polymer electrolyte membrane fuel cell, comprising:
an anode electrode;
a cathode electrode; and
a polymer electrolyte membrane disposed between the anode electrode and the cathode electrode,
wherein at least one electrode selected from the group consisting of the anode electrode the cathode electrode functions as the gas diffusion electrode as defined in claim 22.

36. The polymer electrolyte membrane fuel cell of claim 35, wherein the gas diffusion electrode has an operating temperature ranging from 60 to 75° C.

37. The polymer electrolyte membrane fuel cell of claim 35, wherein cooling of the polymer electrolyte membrane fuel cell is effected solely by means of an air stream passed through the cathode space.

38. The polymer electrolyte membrane fuel cell of claim 35, wherein cooling of the polymer electrolyte membrane fuel cell is effected by water cooling.

* * * * *